April 21, 1970  H. W. LIBERMAN ET AL  3,507,410
STATIONARY PACKER ASSEMBLIES
Filed Feb. 8, 1968  7 Sheets-Sheet 1
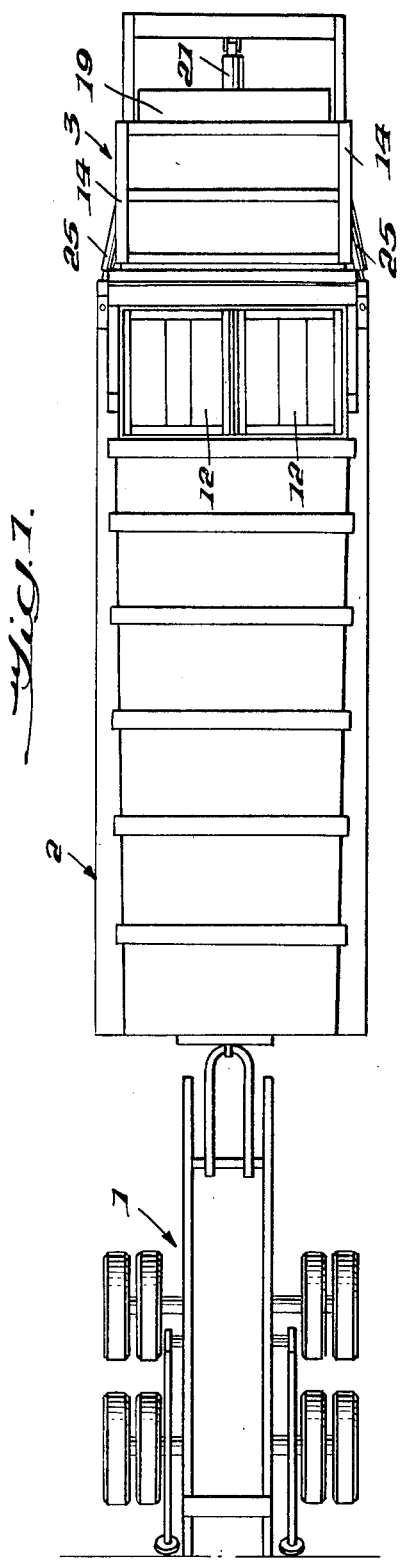
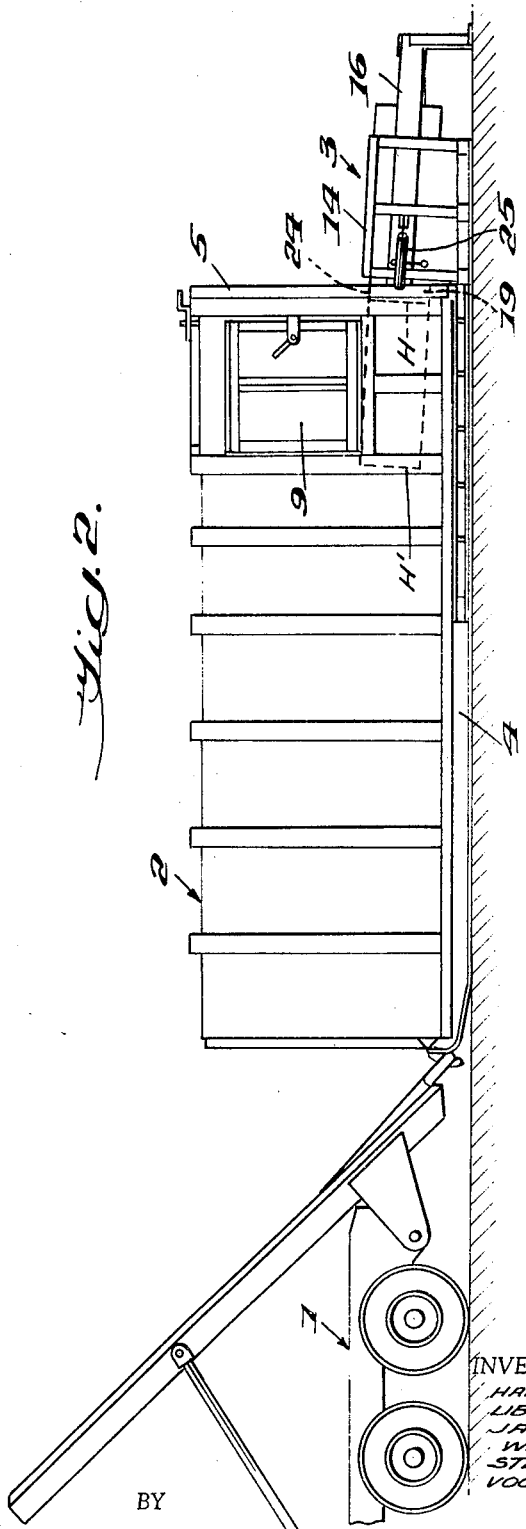
INVENTORS
HARVEY W. LIBERMAN,
JAMES A. WADE,
STEVEN C. VOORHEES
BY
 ATTORNEYS

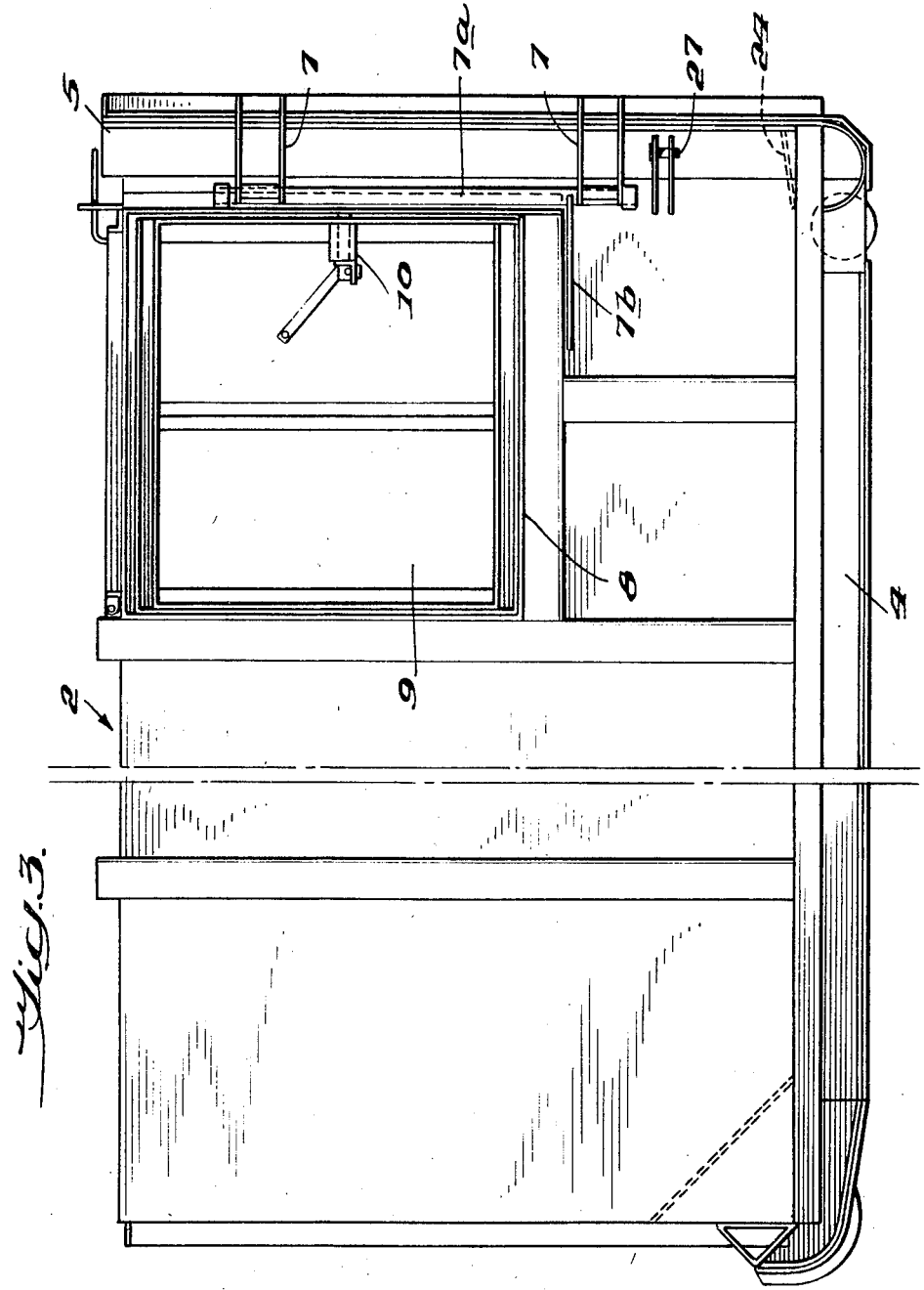

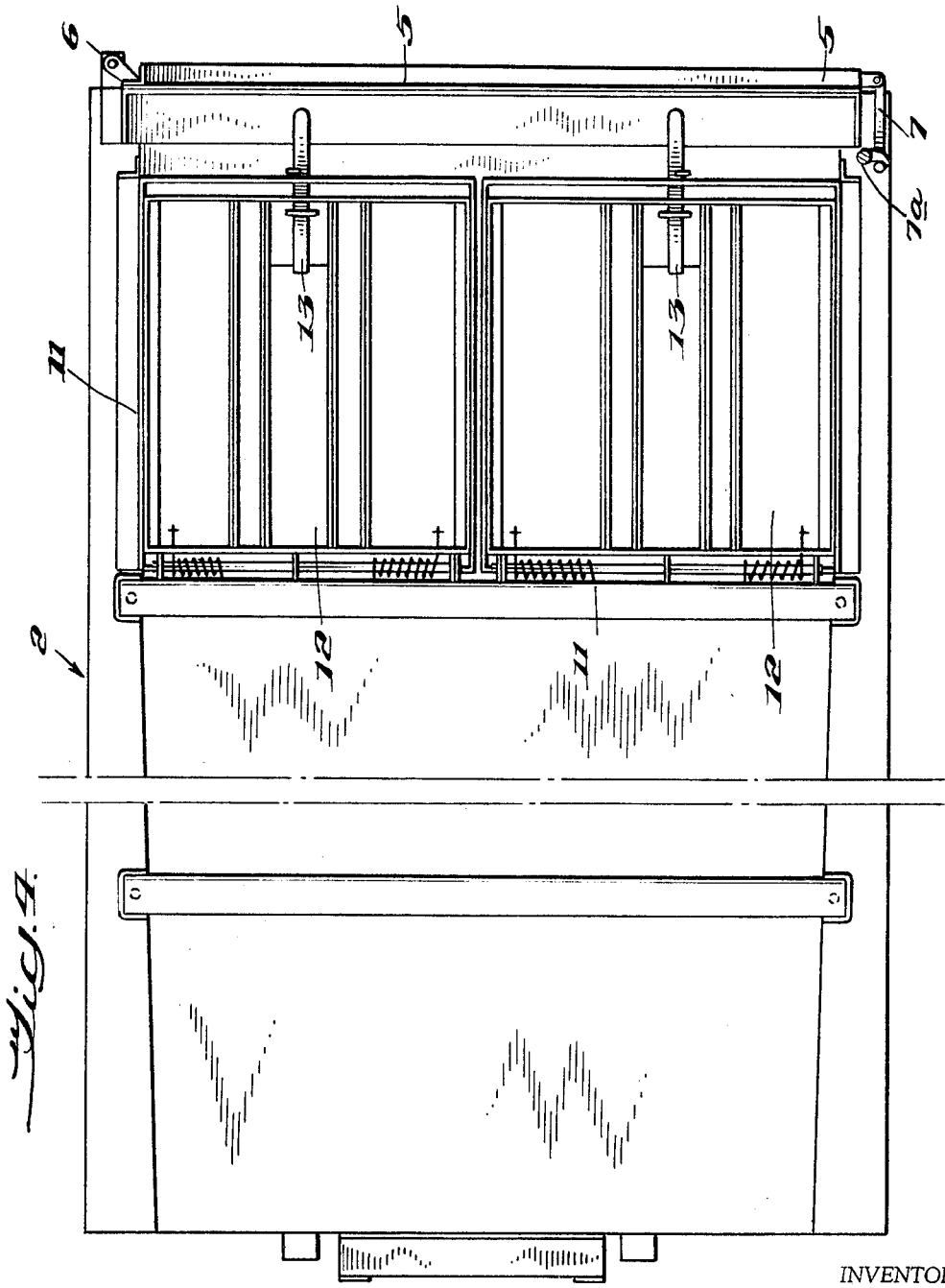

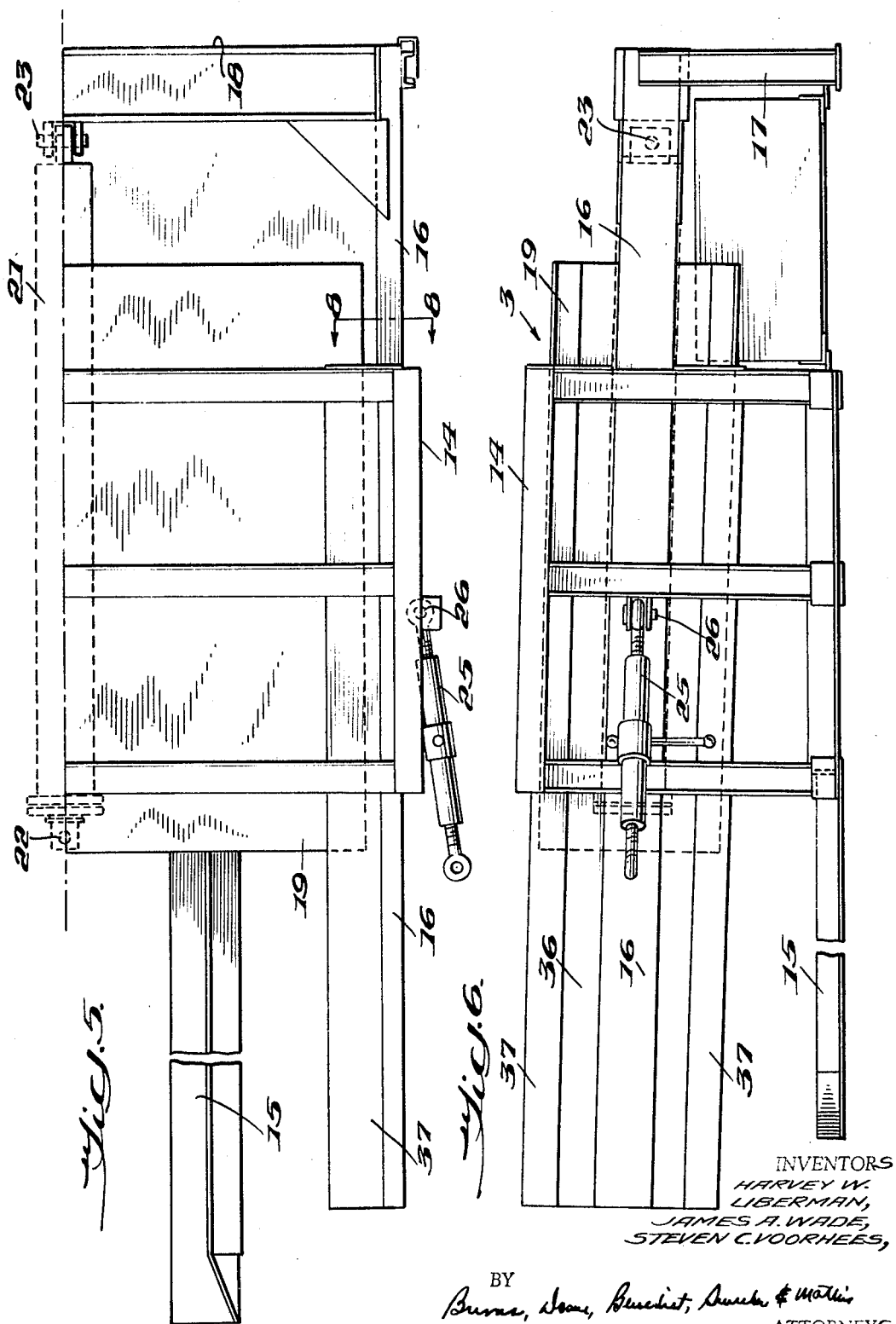

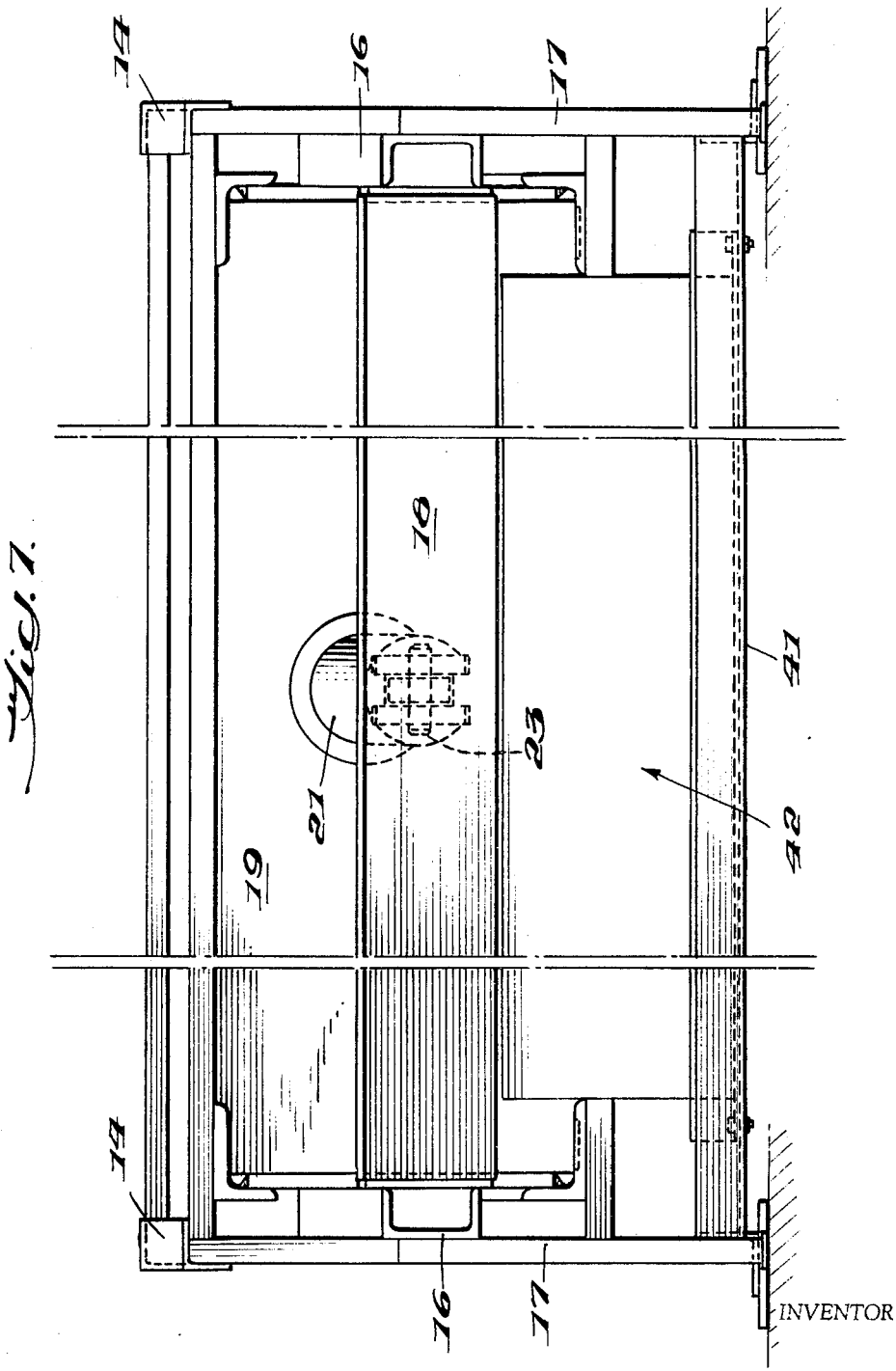

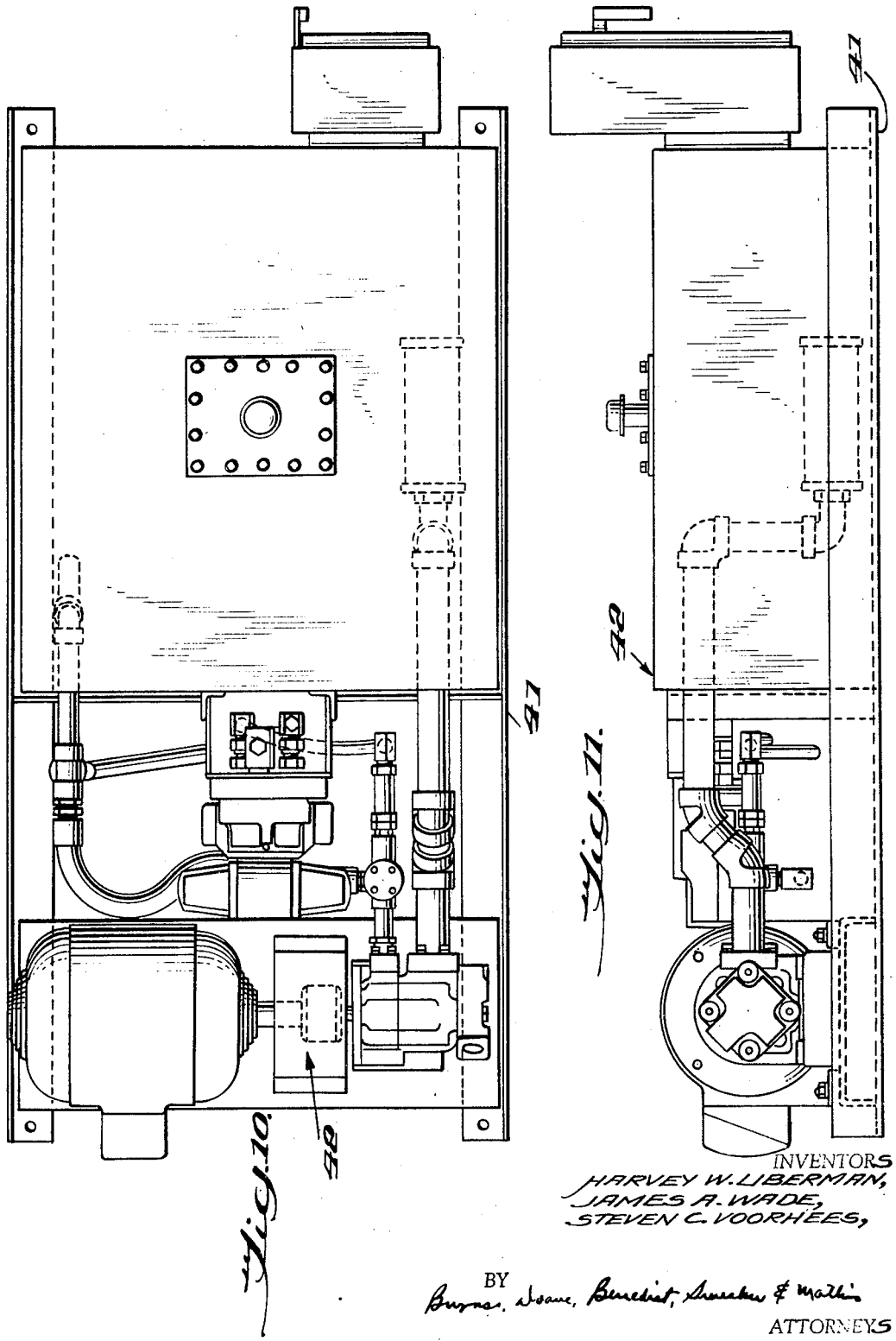

United States Patent Office 3,507,410
Patented Apr. 21, 1970

3,507,410
STATIONARY PACKER ASSEMBLIES
Harvey W. Liberman, James A. Wade, and Steven C. Voorhees, Knoxville, Tenn., assignors to Dempster Brothers, Inc., Knoxville, Tenn., a corporation of Tennessee
Filed Feb. 8, 1968, Ser. No. 703,995
Int. Cl. B65g 67/04
U.S. Cl. 214—41                                   8 Claims

ABSTRACT OF THE DISCLOSURE

A refuse packing and transporting assembly wherein the refuse is placed directly in a transport container while the container is connected with a packer device which is operated to compress the refuse therein. The packer device comprises a relatively simple frame structure mounted in position to have the transport container brought into juxtaposition thereto with an opening in the end of the transport container into and through which a head in the packer operates to compress the refuse in the container after deposit directly into the container. After a suitable quantity of refuse has been packed in the container, the latter may be disconnected from the packer and hauled away for discharging the refuse therefrom.

---

This invention relates to improvements in stationary packer assemblies and, more particularly, to devices for compacting refuse in a transport container after deposit of the refuse in the container.

It has been provided heretofore that refuse would be dumped into a stationary hopper in the top of a packer from which it would be discharged under pressure into a transport body or container. An example thereof is illustrated in French et al. patent, No. 3,229,622, Jan. 18, 1966.

A packer system which includes a stationary hopper not only is complex and expensive, but adds considerable overall length to the packer assembly. Moreover, it is difficult to keep clean, especially when waste foodstuffs are dumped into the hopper and these must be washed down frequently to prevent obnoxious odors.

One object of this invention is to simplify and improve the construction of stationary packer assemblies for this purpose to enable these to be constructed at less cost and with less complexity and to require a substantial reduction in overall space for the use thereof.

Another object of the invention is to provide for the dumping of the refuse directly into the transport container and the utilization of the packer to compress the refuse in the container itself, thereby eliminating the need for and the use of a hopper as a part of the packer assembly.

Still another object of the invention is to provide a secure connection between the transport container and the packer assembly and the operation of the packer head through a sufficient distance into the transport container to effect a compressing action to the refuse as it is discharged into the container, the head operating through the area in which the refuse is directed so as to act on the refuse in that area.

These objects may be accomplished, according to one embodiment of the invention, by providing a suitable transport container such as may be picked up on a vehicle for transport to a remote point for dumping and may be of the order of a truck body. Mounted in a stationary position is a packer assembly which is adapted to have the transport container brought into juxtaposition thereto and to be coupled therewith.

The transport container not only has an opening in the rear end thereof through which the packer operates, but it also has one or more filling openings about the sides thereof and may include the top for directing the refuse into the transport container in the path of the packer head on the packer assembly. The packer head operates through the area of discharge in the transport container so as to effect substantial compaction of the refuse in the container as it is discharged therein.

The packer head is supported by a suitable framework and is operated by a power cylinder to effect operation thereof with force required for compacting the refuse. The structure does not include a hopper which has been eliminated from prior packer assemblies.

This embodiment of the invention is illustrated in the accompanying drawings, in which:

FIG. 1 is a top plan view of a combined transport and packer assembly in coupled relation;

FIG. 2 is a side elevation thereof;

FIG. 3 is a side elevation of the transport container detached;

FIG. 4 is a top plan view thereof;

FIG. 5 is a partial plan view of the packer assembly;

FIG. 6 is a side elevation thereof;

FIG. 7 is an end elevation thereof;

FIG. 10 is a plan view of a power unit, detached, for the packer; and

FIG. 11 is a side elevation thereof.

Figure 8:
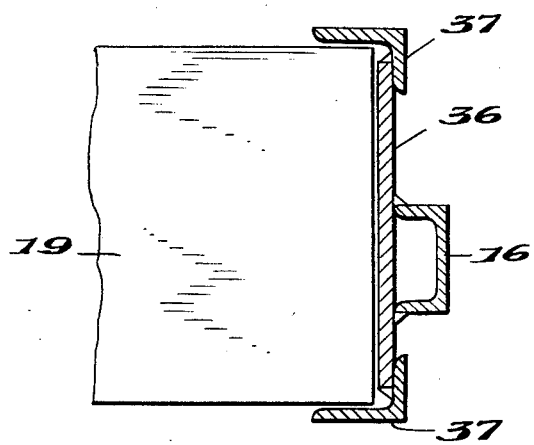
FIG. 8 is a detail cross section of the packer head guide.

Referring to FIGS. 1 and 2, we have shown a transport vehicle, which is designated generally by the numeral 1, connected at the front end of a transport container 2 and the latter, in turn, having its rear end coupled with a packer assembly, generally indicated at 3.

The transport vehicle 1 is provided with means for loading and unloading the transport container 2. This container handling mechanism is illustrated and described more in detail in Patent No. 3,107,020, dated Oct. 15, 1963. Accordingly, the frame structure of the container 2 preferably includes runners 4 extending lengthwise of the container and may also be provided with rollers, if desired, for effecting such lengthwise movement onto and off the vehicle 1. This underframe structure is indicated generally at 4 in FIGS. 2 and 3 and preferably includes means for detachably moving the container onto and off the vehicle such, for example, as step-by-step mechanism of the character described in the aforesaid patent No. 3,107,020.

It is preferred that the top and side walls of the transport container 2 be tapered from front to rear of the container, as will be apparent from FIG. 1, being exaggerated in the illustration for clarity, so that the container is smaller at the front and gradually increases in inside dimension toward the rear, into which latter end the refuse is introduced and compacted. This tapering relation permits the material to be discharged more easily when dumping the container at a remote point. The several sides, including the top and bottom of the container, are rigidly reinforced with angles and channels so as to provide the desired degree of rigidity for compacting the material therein.

At its rear end the container 2 is substantially open throughout the area thereof and is provided with a closure door 5 of substantially the same area as said rear end. The door 5 is hinged to the body of the container 2 at 6 (see FIG. 4) and is capable of being latched in closed position. Suitable latches are indicated generally at 7 in FIG. 3 for engaging the free edge of the door and holding it securely closed. These latches are indicated to be of the toggle type, although any suitable form of latch may be used for the purpose. The toggle latches 7 are secured by catches on a rotary shaft 7a operated by a handle 7b (FIG. 3).

The container 2 is also provided with one or more filling openings adjacent the rear thereof for the deposit of refuse into the rear end portion of the container in a region immediately forward of the rear end of the container. These filling openings may be provided in one or both opposite sides, including the top, and should be provided with doors for closing such openings.

As indicated in FIGS. 2 and 3, side filling openings are shown at 8, provided with hinged closure doors 9 therefor. A latch 10 normally tends to retain each door 9 in closed relation. One or more filling openings may be provided in the top of the body container 2, as indicated at 11. Hinged closure doors 12 are provided for the openings 11. Latches 13 secure the doors 12 in closed relation.

The packer assembly 3 is shown more in detail in FIGS. 5 to 7. It includes a frame, generally indicated at 14, which is connected with track members 15 spaced apart to accommodate thereon the runners 4 of the transport container 2 when the latter is brought into juxtaposition with the packer assembly.

At each opposite side of the frame 14 is a channel-shaped beam 16 having its intermediate portion secured rigidly to and supported by the frame 14 and projecting forwardly and rearwardly therefrom. The rear end portions of the beams 16 are supported by upright standards 17. These beams are rigidly connected together at their rear ends by a cross beam 18 (see FIG. 5 and 7).

Secured to the frame 14 and to the beams 16 are opposite guide plates 36, supported at the upper and lower edges thereof by angle bars 37. These parts 36 and 37 form guides at opposite sides for a compaction head 19 which extends in bridging relation between the guides at opposite sides of the frame 14. The guide plates 36 and angle bars 37 extend forwardly from the frame 14 a substantial distance sufficient to project through the area of deposit in the transport container 2.

The head 19 is mounted for reciprocating movement by a hydraulic cylinder, generally indicated at 21, pivotally connected at one end at 22 by a suitable pin with the forward end of the head 19, and at the opposite end of the cylinder 21 is pivotally connected at 23 with the cross member 18 so as to allow some vertical flexibility of the head 19.

The container 2 is adapted to be brought into juxtaposition with the packer unit 3, as shown in FIG. 2, so as to allow the head 19 to reciprocate through an opening 24 provided in the lower portion of the door 5 of the container 2. The relation of the head 19 to the frame 14 is such that the head normally projects forwardly therefrom so that upon movement of the container 2 into position for coupled relation therewith, as shown in FIG. 2, the head 19 may be reciprocated across the area of deposit of material inside the container. In its retracted position, the forward end of the head will be approximately flush with the inside rear door of the container.

Provision should be made for detachably coupling the container with the packer unit. One form of lock device for this container is shown in FIGS. 1, 2, 5 and 6. This form involves coupling links 25 for this purpose, pivoted at 26 on each opposite side of the frame 14. Each of the coupling links 25 has an eyelet at the opposite end thereof, to be connected by a pin 27 (FIG. 3) with the container 2 in secure juxtaposition relation. This coupled relation is capable of being tightened to effect the secure connection therebetween.

Figure 9:
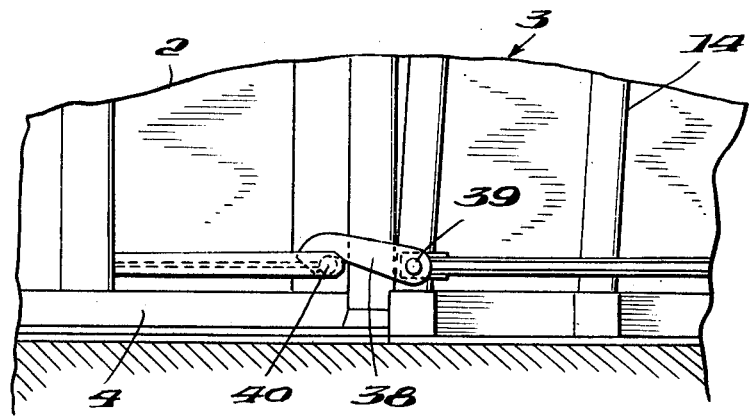
FIG. 9 is a side elevation of an assembly showing a modification of the body connection.

Another form of lock device that may be used, if desired, between the container 2 and the packer 3 is illustrated in FIG. 9. This involves one or more hooks 38 on each opposite side of the equipment pivoted at 39 to the frame 14 in position for hook engagement with a pin 40 on a side of the container 2. These hooks 38 may be operated automatically or manually for engagement.

The frame 14 and supporting standards 17 are constructed to receive therein a subframe 41 suitably secured to the frame and standards. This subframe 41 is a unitary subframe which serves to support a removable power unit, generally indicated at 42 in FIGS. 10 and 11. This self-contained power unit 42 supplies hydraulic power to the cylinder 21 and conserves space by being located under the machine, although it may be located remote therefrom if preferred. By the utilization of a self-contained power unit the substitution or revision of the components of the unit may be varied as desired.

During normal use, the container 2 and packer 3 are connected together, as shown in FIGS. 1 and 2, but the vehicle 1 is separated and disconnected therefrom. In such use, the refuse is placed in the container 2 through one of the openings, such as a side or top, and the cover door thereof should be closed. The compaction head 19, which is normally in the retracted position indicated at H in FIG. 2, reciprocates through the area of deposit of refuse to the projected position shown at H' in FIG. 2, entirely across the area of deposit of refuse so as to move all of the refuse out of this area and to compact it forwardly in the container 2. The area of the compaction head 19 is such that it substantially covers the transverse width of the container 2 at the inside thereof and by thus operating through the area of deposit of refuse, this head will effect substantial compaction therein.

After a desired quantity of refuse has been placed in the container 2 and it is desirable that the container be transported to a suitable point for discharge of the refuse, the vehicle 1 may be brought into connected relation therewith, as indicated in FIGS. 1 and 2. The connecting links 25 should then be disconnected at the pins 27, if used, or the hooks 38 disconnected at 40, to allow the container to be separated and removed from the packer unit. The container will then be moved by the vehicle onto the latter for transporting to a remote point. If desired, the opening at 24 may be covered during this removal by the provision of a suitable cover thereover.

After dumping the contents from the container, the latter may be brought back to the point of filling and reconnected to the packer unit or taken to another packer unit as desired. It is a relatively simple matter to slide the container along the tracks 15 into coupled relation with the packer unit when it is necessary merely to connect the couplings 25 or hooks 38, and with the packer head 19 retracted in the opening 24 so as to have the unit in operative relation.

This packing system is essentially enclosed when the doors in the container are closed. This is contrasted to the typical stationary packer assembly having a charging box where, if the packer head is left in a retracted position, there is an opening into the rear of the container through the charging box through which odors may emanate, material can blow or persons could enter the container, possibly endangering them. None of this is possible, however, according to this invention because the packer head, in its retracted postion, effectively closes the opening into the container and there is no charging box to expose undesirable portions of the packer.

The charging area is not a part of the packer, but is confined within the container. Thus, it is easier to keep it in a relatively clean condition since this area is essentially the container floor. When the container is pulled away from the packer, there is little, if any, structure that can retain refuse or would require cleaning in a system handling food waste, for example, or other contaminating materials.

The short length of the machine in comparison with its displacement makes for simplicity of construction and inexpensive manufacture. The fact that the total head displacement is within the container eliminates extensive travel distance from the overall system dimension which reduces appreciably the packer head stroke as compared with the conventional stationary packer.

The packer head and supporting structure therefor is mounted in an elevated position, as shown in FIG. 6, to allow clearance beneath the frame and guides specially when the container is pulled away from the packer. This makes it easy to clean and aids materially in keeping the entire packer assembly free of contamination, waste and from objectionable materials.

This provides a short overall system, as compared with conventional packer systems that include a hopper as used heretofore. It is completely enclosed, inasmuch as the refuse is discharged directly into the container, which is then closed. A relatively clean, permanent installation can be obtained because there is no charging hopper which must be cleaned frequently, especially when waste foodstuffs are involved, to prevent obnoxious odors.

The system is capable of variable loading arrangements, either from the top of the container or from the side or, if desired, throuhg an opening at the rear, above the packer. A simple and inexpensive power unit is provided which permits installation in any desired location.

While the invention has been illustrated and described in one embodiment, it is recognized that variations and changes may be made therein without departing from the invention.

We claim:

1. A stationary packer assembly comprising a refuse container having an inlet opening and a filling area in the container adjacent the inlet opening, said container having a filling opening a side thereof into said filling area, a packer frame connected with the container, a packer head operatively mounted on the packer frame and extending in the inlet opening, and means for reciprocating the packer head across the filling area.

2. A stationary packer assembly comprising a refuse container having an inlet opening and a filling area in the container adjacent the inlet opening, said container having a filling opening in a side thereof into said filling area, a packer frame connected with the container, a packer head operatively mounted on the packer frame and extending in the inlet opening, means for reciprocating the packer head across the filling area, and means for removing the container from the packer frame and head.

3. A stationary packer assembly according to claim 1, wherein the packer head is operated in the inlet opening between positions on opposite sides of the filling opening.

4. A stationary packer assembly according to claim 1, wherein the filling opening is in a side of the container spaced from the adjacent end thereof in which the inlet opening is located, and the packer head is reciprocated between retracted and advanced positions both located within the container.

5. A stationary packer assembly according to claim 1, wherein the packer frame extends directly to the container, and connections between the frame and the container.

6. A stationary packer assembly comprising a refuse container having surrounding walls and an end wall, said end wall having an inlet opening therein, the container having a filling area between the surrounding walls adjacent the end wall, one of the surrounding walls having a filling opening into said filling area, a packer frame externally of the container and connected with the container, a packer head operatively mounted on the packer frame and extending in the inlet opening, and means for reciprocating the packer head from a retracted position across the filling area to an advanced position.

7. A stationary packer assembly according to claim 6, including a hopper supported by the packer frame for admitting material in front of the packer head in said retracted position.

8. A stationary packer assembly according to claim 6, including means for removing the container from the packer frame and head.

References Cited

UNITED STATES PATENTS

| 3,071,264 | 1/1963 | Totaro et al. | 214—41 XR |
| 3,229,622 | 1/1966 | French et al. | 214—41 XR |

ROBERT G. SHERIDAN, Primary Examiner

U.S. Cl. X.R.

100—229